(12) United States Patent
Gebhart et al.

(10) Patent No.: US 7,739,686 B2
(45) Date of Patent: Jun. 15, 2010

(54) GRID MANAGED APPLICATION BRANCHING BASED ON PRIORITY DATA REPRESENTING A HISTORY OF EXECUTING A TASK WITH SECONDARY APPLICATIONS

(75) Inventors: Alexander Gebhart, Bad Schoenborn (DE); Erol Bozak, Pforzheim (DE)

(73) Assignee: SAP AG, Walldorf (DE)

( * ) Notice: Subject to any disclaimer, the term of this patent is extended or adjusted under 35 U.S.C. 154(b) by 1575 days.

(21) Appl. No.: 11/018,735

(22) Filed: Dec. 21, 2004

(65) Prior Publication Data

US 2006/0136917 A1    Jun. 22, 2006

(51) Int. Cl.
*G06F 9/46* (2006.01)
*G06F 15/16* (2006.01)

(52) U.S. Cl. .................. 718/103; 718/104; 718/105; 709/201; 709/202; 709/203

(58) Field of Classification Search ........... 718/103, 718/104, 105; 709/201, 202, 203
See application file for complete search history.

(56) References Cited

U.S. PATENT DOCUMENTS

2004/0193679 A1*  9/2004  Tecco et al. ............... 709/203
2005/0262506 A1*  11/2005  Dawson et al. ............ 718/100

FOREIGN PATENT DOCUMENTS

WO    WO 2005104494 A2 *  11/2005

* cited by examiner

*Primary Examiner*—Meng-Ai An
*Assistant Examiner*—Kenneth Tang
(74) *Attorney, Agent, or Firm*—Finnegan, Henderson, Farabow, Garrett & Dunner LLP

(57) ABSTRACT

A method includes, in a grid network, maintaining a list of applications that can solve a task, the list referencing at least one primary application and a plurality of secondary applications used to solve the task, executing the task with the primary application in response to a request to solve the task, and executing the task with one or more of the secondary applications according to grid resource availability.

17 Claims, 4 Drawing Sheets

GRID MANAGED APPLICATION BRANCHING BASED ON PRIORITY DATA REPRESENTING A HISTORY OF EXECUTING A TASK WITH SECONDARY APPLICATIONS

TECHNICAL FIELD

The present invention relates to data processing by digital computer, and more particularly to grid managed application branching.

BACKGROUND

Grid computing is a form of distributed system wherein computing resources are shared across networks. Grid computing enables the selection, aggregation, and sharing of information resources resident in multiple administrative domains and across geographic areas. These information resources are shared, for example, based upon their availability, capability, and cost, as well as a user's quality of service (QoS) requirements. Grid computing can mean reduced cost of ownership, aggregated and improved efficiency of computing, data, and storage resources, and enablement of the creation of virtual organizations for applications and data sharing.

SUMMARY

The present invention provides methods and apparatus, including computer program products, for grid managed application branching.

In one aspect, the invention features a method including, in a grid network, maintaining a list of applications that can solve a task, the list referencing at least one primary application and a plurality of secondary applications used to solve the task, executing the task with the primary application in response to a request to solve the task, and executing the task with one or more of the secondary applications according to grid resource availability.

In embodiments, the method can include executing the task with the one or more applications if a time limit has not expired. The list can maintained by a grid manager and stored as an extensible markup language (XML) file.

The plurality of applications can include priority data. The priority data can be derived from historical execution data. The priority data can be user-defined. The time limit can be user selected. The time limit can be determined according to a resource availability.

In another aspect, the invention features a method including, in a grid network, maintaining a store of applications, each of the applications maintaining a list of analogous applications within the grid network capable of performing similar tasks, executing an application in the store in response to receiving a task request, and executing analogous applications contained in a list associated with the executing application in response to the task request according to grid resource availability.

In embodiments, the executing application can reside in a first grid compute node. The executing analogous applications contained in a list associated with the executing application can reside in a plurality of grid compute nodes. The executing analogous applications contained in a list associated with the executing application can be executed if a time limit is not expired. The time limit can be user selected.

The executing analogous applications contained in a list associated with the executing application are executed according to a priority. The priority can be user-defined. The priority can be set according to historical data. The historical data can represent performance statistics.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
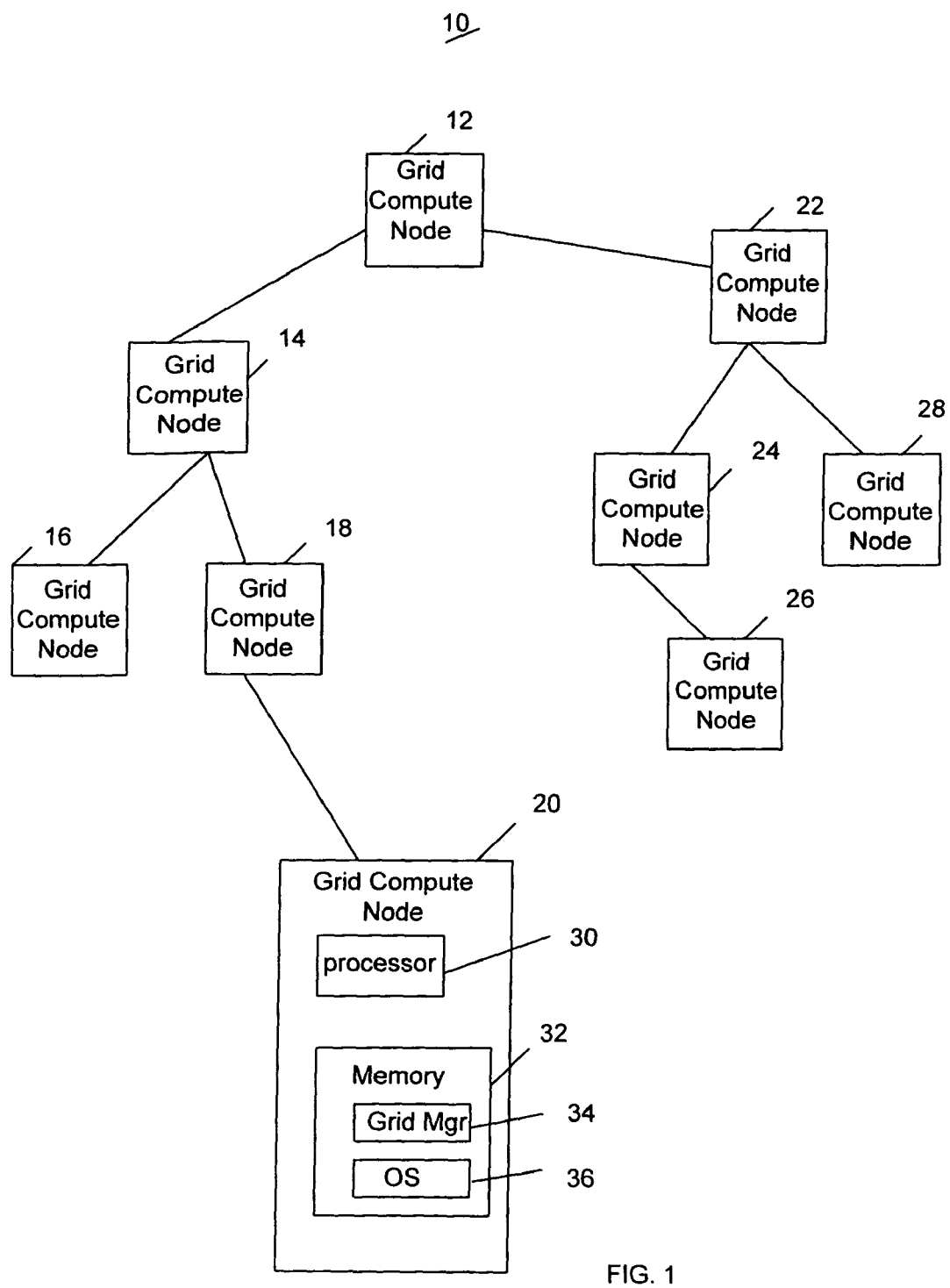
FIG. 1 is block diagram.

As shown in FIG. 1, a grid network 10 in accordance with one embodiment of the invention includes a number of interconnected grid compute nodes 12, 14, 16, 18, 20, 22, 24, 26, 28. In an example, the grid network 10 is implemented as a client-server network. Client/server describes a relationship between two computer programs in which one program, the client, makes a service request from another program, the server, which fulfills the request. Although the client/server idea can be used by programs within a single computer, it is a more important idea in a network, such at network 10. In a network, the client/server model provides a convenient way to interconnect programs that are distributed efficiently across different locations.

In the client/server model, one server, sometimes called a daemon, is activated and awaits client requests. Typically, multiple client programs share the services of a common server program. Both client programs and server programs are often part of a larger program or application. Relative to the Internet, a Web browser is a client program that requests services from a Web server in another computer somewhere on the Internet.

Each of the grid compute nodes, grid compute node 20 for example, can include a processor 30 and a memory 32. Memory 32 can include a grid manager 34 and an operating system (OS) 36, such as Unix, Linux or Windows.

Each of the grid compute nodes 12, 14, 16, 18, 20, 22, 24, 26 and 28 include applications capable of executing in response to a request to perform a task. The request can be automatic or user-generated. We call these applications "grid-enabled" applications. In many instances, multiple grid-enabled applications can execute to perform a single requested task in different ways, which can lead to different results. A user may wish to see results generated by the multiple diverse grid-enabled applications capable of executing the single requested task.

Figure 2:
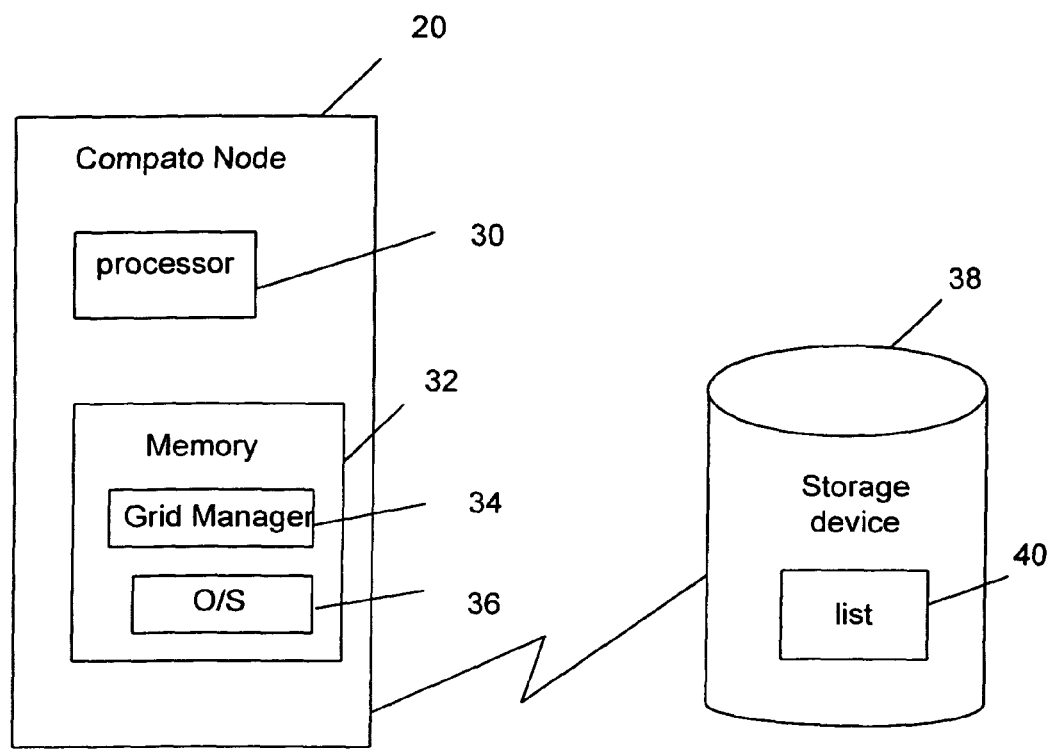
FIG. 2 is a block diagram.

As shown in FIG. 2, each grid compute node 12, 14, 16, 18, 20, 22, 24, 26 and 28 stores and maintains a list of applications and associated tasks that they can perform in response a request to execute a task. For example, grid compute node 20 includes a storage device 38 containing a list 40. In a particular example, the list 40 is managed by the grid manager 34. In another particular example, the list 40 is stored as an extensible markup language (XML) file.

Figure 3:
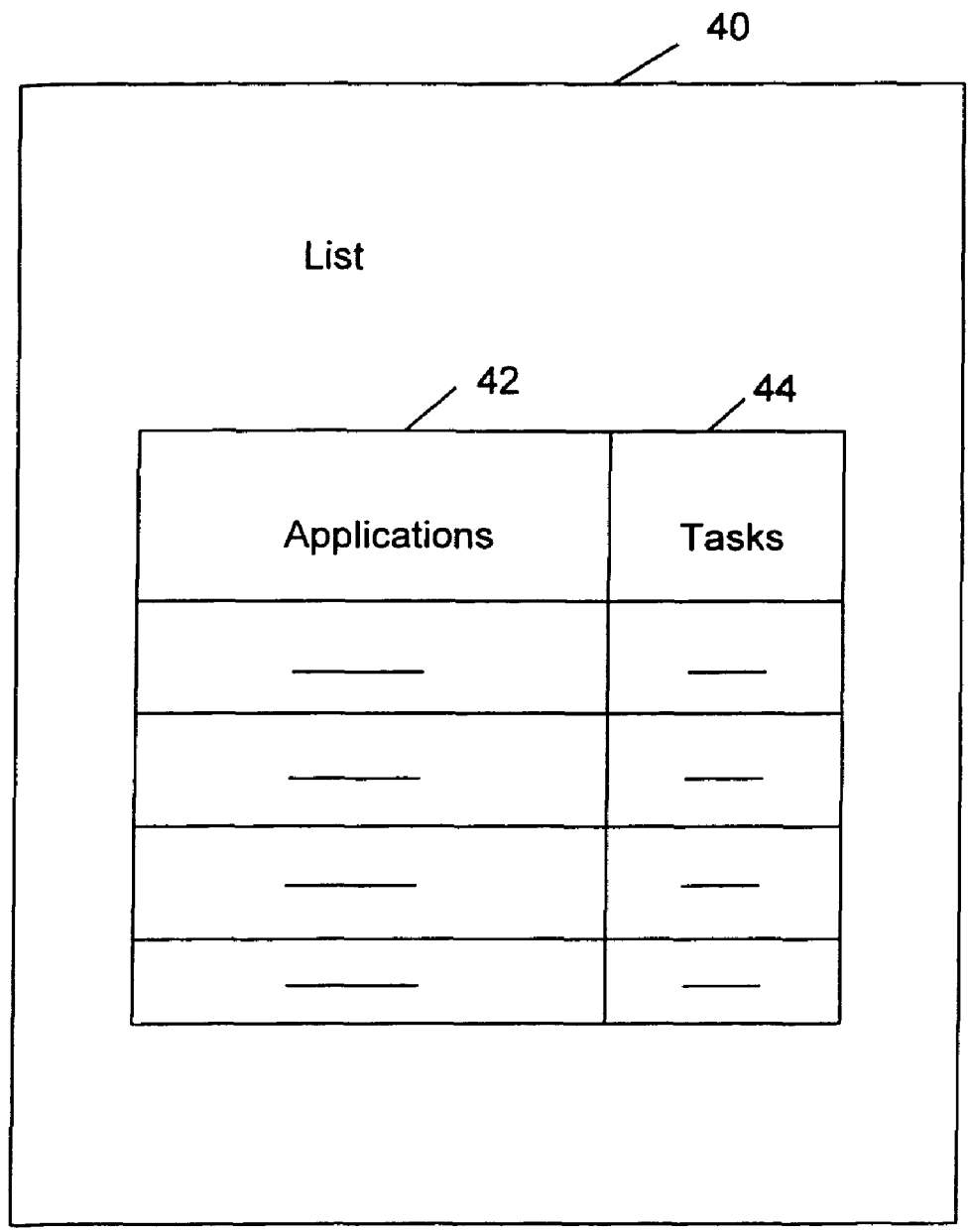
FIG. 3 is a block diagram.

As shown in FIG. 3, the list 40 can include references to applications 42 and associated tasks 44 that the applications 42 can execute. The actual applications can reside in the grid compute node 20 or any of the grid compute nodes 12, 14, 16, 18, 22, 24, 26 and 28 in network 10. In a particular example, the list 40 includes a primary application that is used to execute a particular task and one or more secondary applications that can be used to execute the particular task. In another example, the references to applications 42 include priority data that indicates an order in which applications are to execute a specific task. In one embodiment, the priority data is user-defined, giving a user control over application execution for any particular task. In another embodiment, the priority data is derived from historical data, e.g., the speed, reliability, accuracy and so forth, for the execution of a particular task by a particular application in a particular grid compute node over a period of time. In still other embodiments, execution of a requested task in one or more applications continues as long as a predefined time limit is not exceeded.

Figure 4:
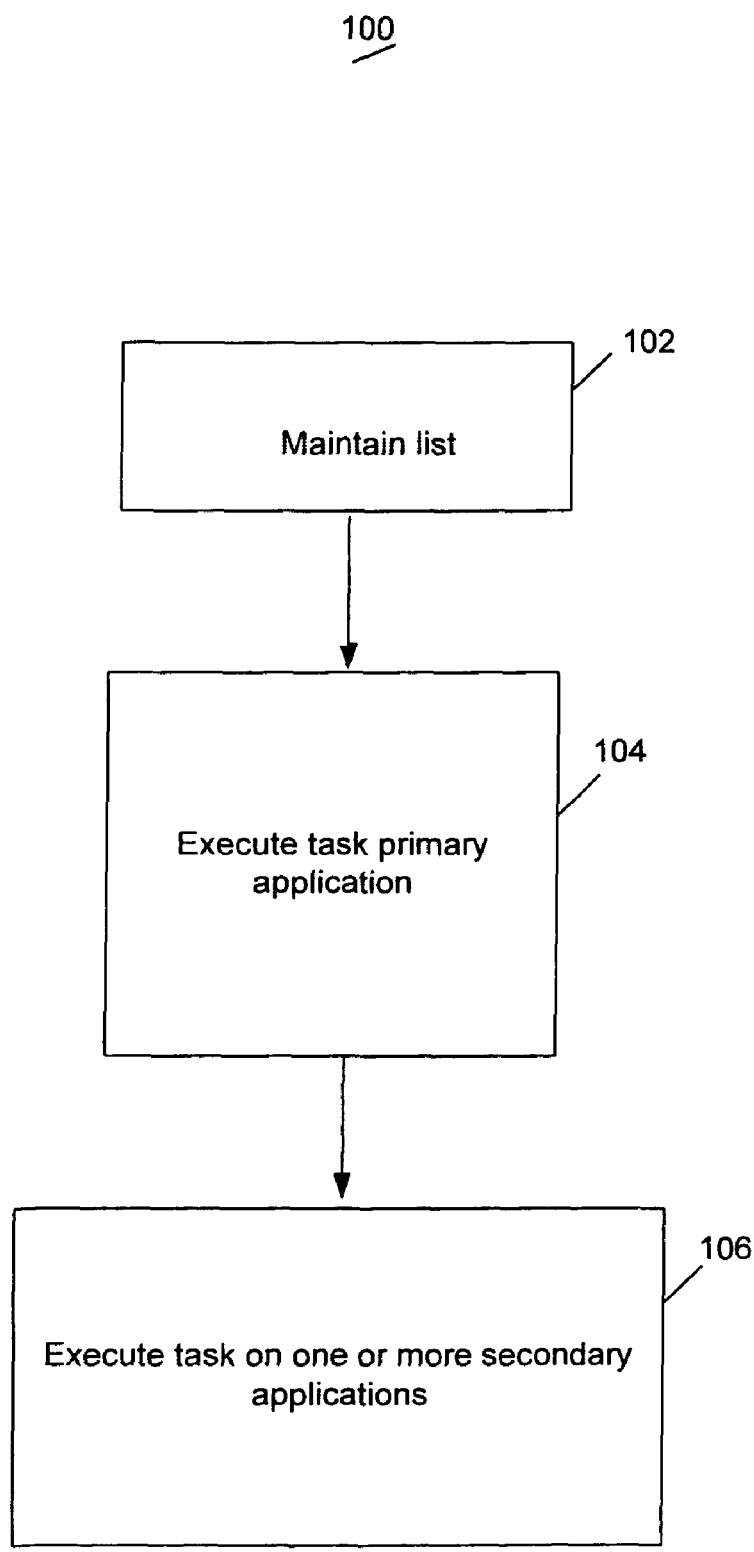
FIG. 4 is a flow diagram.
Like reference symbols in the various drawings indicate like elements.

As shown in FIG. 4, a grid managed application branching process 100 includes maintaining (102) a list of applications that solve a particular task, the list referencing at least one primary application that can execute the particular task and a number of secondary applications that can execute the particular task. In a particular embodiment, the list is stored as an XML file.

Process 100 executes (104) a particular task with the primary application in response to a request to solve the task. The primary application associated with the task is found in the list 40. The process 100 executes (106) the particular task with one or more of the secondary applications found in the list 40. The secondary applications can be executed (106) according to grid resource availability, e.g., on grid compute modes that are available at the time of the request to solve the task.

Executing (106) can continue if a time limit has not expired. The time limit can be user selected. Executing (106) can be performed with applications according to a priority. The priority can be user defined and/or represent a history of executing the particular task with a particular application. For example, the history can include application execution speed, application reliability, grid compute node reliability, application accuracy, and so forth.

By applying process 100 there is a guarantee that there will be at least one result, and there is a possibility to get even better results if there is more processing power available.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD☐ROM and DVD-ROM disks. The processor and the memory can be supplemented by, or incorporated in special purpose logic circuitry.

The invention has been described in terms of particular embodiments. Other embodiments are within the scope of the following claims. For example, the steps of the invention can be performed in a different order and still achieve desirable results.

What is claimed is:

1. A method comprising:
storing, in a storage device, a list of applications that can perform a task, the list referencing at least one primary application and a plurality of secondary applications used to perform the task;
maintaining priority data representing a history of executing the task with the secondary applications, the history including one or more of application execution speed, application reliability, grid compute node reliability, or application accuracy;
executing the task with the primary application in response to a request to perform the task; and
executing the task with one or more of the secondary applications according to grid resource availability, the task being executed by the one or more secondary applications according to the priority data,
wherein the execution of the task by the one or more secondary applications is limited in accordance with a time limit.

2. The method of claim 1 wherein the list is maintained by a grid manager.

3. The method of claim 1 wherein the list is stored as an extensible markup language (XML) file.

4. The method of claim 1 wherein the secondary applications include the priority data.

5. The method of claim 4 wherein the priority data is derived from historical execution data.

6. The method of claim 4 wherein the priority data is user-defined.

7. The method of claim 1 wherein the time limit is user-selected.

8. The method of claim 1 wherein the time limit is determined according to a resource availability.

9. A computer program product, tangibly embodied in a machine-readable storage device, for application in a grid network, the computer program product being operable to cause data processing apparatus to:

store a list of applications that can solve a task, the list referencing at least one primary application and a plurality of secondary applications used to solve the task;

maintain priority data representing a history of executing the task with the secondary applications, the history including one or more of application execution speed, application reliability, grid compute node reliability, or application accuracy;

execute the task in the primary application in response to a request to solve the task; and execute the task in one or more of the secondary applications according to grid resource availability, the task being executed by the one or more secondary applications according to the priority data, wherein the execution of the task by the one or more secondary applications is limited in accordance with a time limit.

10. The product of claim 9 wherein the list is maintained by a grid manager.

11. The product of claim 9 wherein the list is stored as an extensible markup language (XML) file.

12. The product of claim 9 wherein the secondary applications include the priority data.

13. The product of claim 12 wherein the priority data is derived from historical execution data.

14. The product of claim 12 wherein the priority data is user-defined.

15. The product of claim 9 wherein the time limit is user selected.

16. The product of claim 9 wherein the time limit is determined according to a resource availability.

17. A computer-implemented method implemented in a grid network comprising a plurality of grid nodes, the method comprising the steps performed by a first one of the grid nodes of:

storing, in a storage device, a list comprising a plurality of applications and a plurality of tasks, the list identifying locally-executable applications and remotely-executable applications for executing the plurality of tasks;

receiving a request to execute a selected one of the task;

receiving a user-specified time limit for completing the selected task;

identifying, from the locally-executable applications comprising the list, a first application for executing the selected task;

locally executing the selected task with the first application to generate a first result;

identifying, from the remotely-executable applications comprising the list, a second application and a third application for executing the selected task;

determining, based on resources available on the plurality of grid nodes, a second grid node for executing the second application and a third grid node for executing the third application;

requesting remote execution of the selected task from the second grid node, the second grid node executing the selected task with the second application, wherein the second grid node completes the task and generates a second result provided the second grid node does not exceed the user-specified time limit when executing the selected task; and requesting remote execution of the selected task from the grid node, the third grid node executing the selected task with the third application, wherein the third grid node completes the task and generates a third result provided the third grid node does not exceed the user-specified time limit when executing the selected task;

wherein one or more of the first result, the second result, and the third result are provided in response to the request, depending on whether the second result and the third result are generated within the user-specified time limit, and wherein at least the remote execution of the selected task by the second grid node or the third grid node is performed according to a priority representing one or more of application execution speed, application reliability, grid compute node reliability, or application accuracy.

* * * * *